US 6,717,614 B1

(12) United States Patent
Iida

(10) Patent No.: US 6,717,614 B1
(45) Date of Patent: Apr. 6, 2004

(54) IMAGE SYNTHESIZING APPARATUS, IMAGE SYNTHESIZING METHOD, AND COMPUTER-READABLE RECORDING MEDIUM IN WHICH AN IMAGE SYNTHESIZE PROCESSING PROGRAM IS RECORDED

(75) Inventor: Kentaro Iida, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/437,404

(22) Filed: Nov. 10, 1999

(30) Foreign Application Priority Data

Nov. 10, 1998 (JP) ............................................ 10-336607

(51) Int. Cl.[7] ................................................. H04N 5/26
(52) U.S. Cl. ..................... 348/239; 348/207.1; 382/294
(58) Field of Search .............................. 348/36, 37, 39, 348/207.1, 208.99, 239, 218.1, 50; 382/294, 295, 173, 284, 256, 257; 345/611, 629

(56) References Cited

U.S. PATENT DOCUMENTS 5,798,791 A * 8/1998 Katayama et al. ........ 348/218.1
6,075,905 A * 6/2000 Herman et al. ............. 382/284
6,249,616 B1 * 6/2001 Hashimoto ................. 382/284
6,304,284 B1 * 10/2001 Dunton et al. ............... 348/36
6,549,681 B1 * 4/2003 Takiguchi et al. .......... 382/294
6,570,613 B1 * 5/2003 Howell ..................... 348/219.1
6,577,351 B1 * 6/2003 Yu et al. ..................... 348/624

FOREIGN PATENT DOCUMENTS

JP          09081724          3/1997

* cited by examiner

Primary Examiner—Wendy R. Garber
Assistant Examiner—Jacqueline Wilson
(74) Attorney, Agent, or Firm—Burns, Doane, Swecker & Mathis, L.LP.

(57) ABSTRACT

An image synthesis apparatus for use in, e.g., a digital camera or other image processing device which includes a control system. The control system includes image memory for storing said converted image data; and a CPU performing an image synthesize process by using the data of the images stored in the image memory, producing a blurred image from the original image, and performing an iterative search for the coincidence position by using the blurred image to detect the amount of deviation.

12 Claims, 10 Drawing Sheets

FIG. 4(A)  FIG. 4(B)
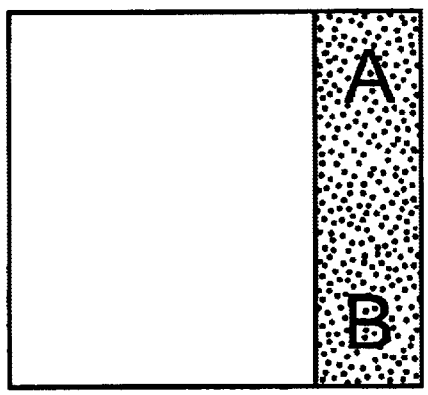 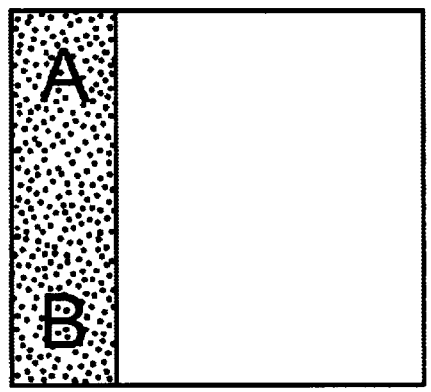
left image  right image
correction of  Δx, Δy  (parallel displacement)
deviation amount:  θ  (rotation displacement)
mag  (magnification change)
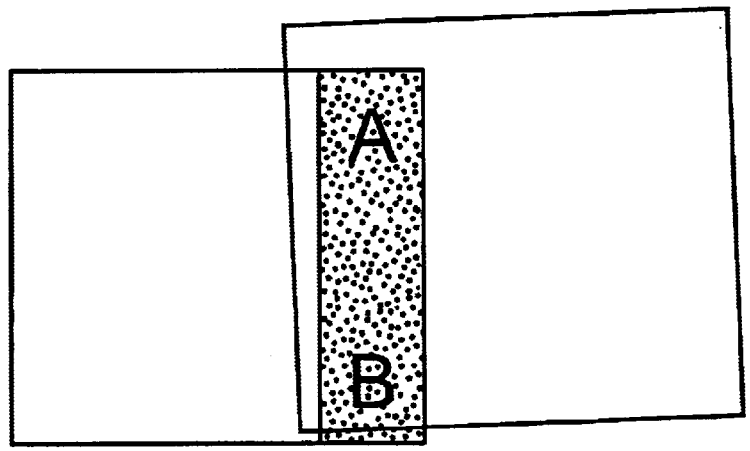
synthesized image
FIG. 4(C)

FIG. 5A
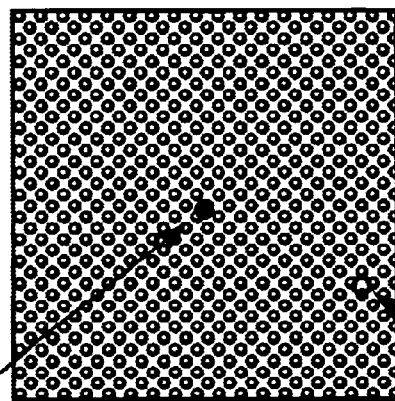
standard position for synthesis
coincidence position
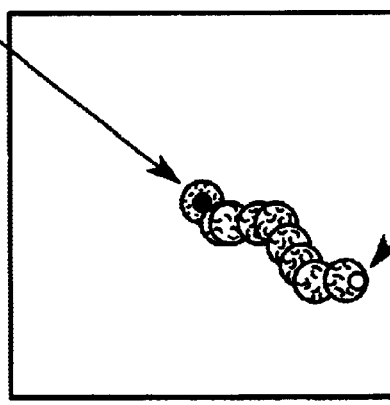
FIG. 5B

IMAGE SYNTHESIZING APPARATUS, IMAGE SYNTHESIZING METHOD, AND COMPUTER-READABLE RECORDING MEDIUM IN WHICH AN IMAGE SYNTHESIZE PROCESSING PROGRAM IS RECORDED

The present application is based on Japanese Application No. 10-336607 filed on Nov. 10, 1998, herein incorporated by reference.

FIELD OF THE INVENTION

The present invention relates to an image synthesizing apparatus, an image synthesizing method, and a computer-readable recording medium on which an image synthesize processing program is recorded, and particularly to such an apparatus, a method, and a program which are suitable for an image containing characters.

BRIEF DESCRIPTION OF RELATED ART

Conventionally, a camera-type imaging apparatus has been proposed which performs imaging on a natural image, a manuscript image, or the like with splitting the image into a plural regions. In such an apparatus, it is required to synthesize an image while detecting deviation among overlapping portions of the image which has been imaged with segmenting the image into plural regions.

As a method of detecting deviation of such overlapping portions of images, a sequential residual detecting method is known. In the sequential residual detecting method, images are virtually deviated from one another, and the deviation position of the highest degree of coincidence is then searched. As the degree of coincidence, the method uses the square sum of differences between pixel values, or the like. At the timing when, during the process of calculation of the degree of coincidence at a certain position, the value of the degree of coincidence is not higher than the value of the highest degree of coincidence (the minimum value of the square sums) in the previous calculations, the calculation of the degree of coincidence in this position is stopped. The calculation in the next position is then performed. As a result, wasted calculations can be reduced.

When, in addition to the vertical/lateral components, also rotation, expansion, contraction, and other components (such as distortion) are added as deviation components, however, the search space becomes so enormous that, when the sequential residual detecting method is applied as it is, the effect of reducing the complexity is not sufficiently attained.

SUMMARY OF THE INVENTION

In order to solve the above problem, the following countermeasure may be taken. The deviation position is gradually changed from a standard position to a position of a higher degree of coincidence, thereby enabling the search to reach a coincident deviation position along an efficient search path.

In this countermeasure, however, there is a tendency that, for a binary or linear image, the degree of coincidence is not smoothly changed with respect to the amount of deviation. When no further countermeasure is taken, therefore, there arises a possibility that the search is ended in the middle of a search path or at the maximal point of the degree of coincidence and the amount of deviation cannot be correctly detected.

Therefore, the technical problem which is to be solved by the invention is to provide an image synthesizing apparatus, an image synthesizing method, and a computer-readable recording medium on which an image synthesize processing program is recorded, the apparatus, the method, and the program being able to correctly detect an amount of deviation among images.

BRIEF DESCRIPTION OF THE DRAWINGS

The present invention will now be described by way of exemplary embodiments to which it is not limited and with reference to the accompanying drawings, in which:

FIGS. 4A, 4B and 4C are diagrams illustrating image synthesis;

FIG. 5 is a diagram illustrating searching;

DETAILED DESCRIPTION OF PREFERRED EMBODIMENTS

Hereinafter, a digital camera which is an embodiment of the invention will be described with reference the accompanying drawings.

Figure 1:
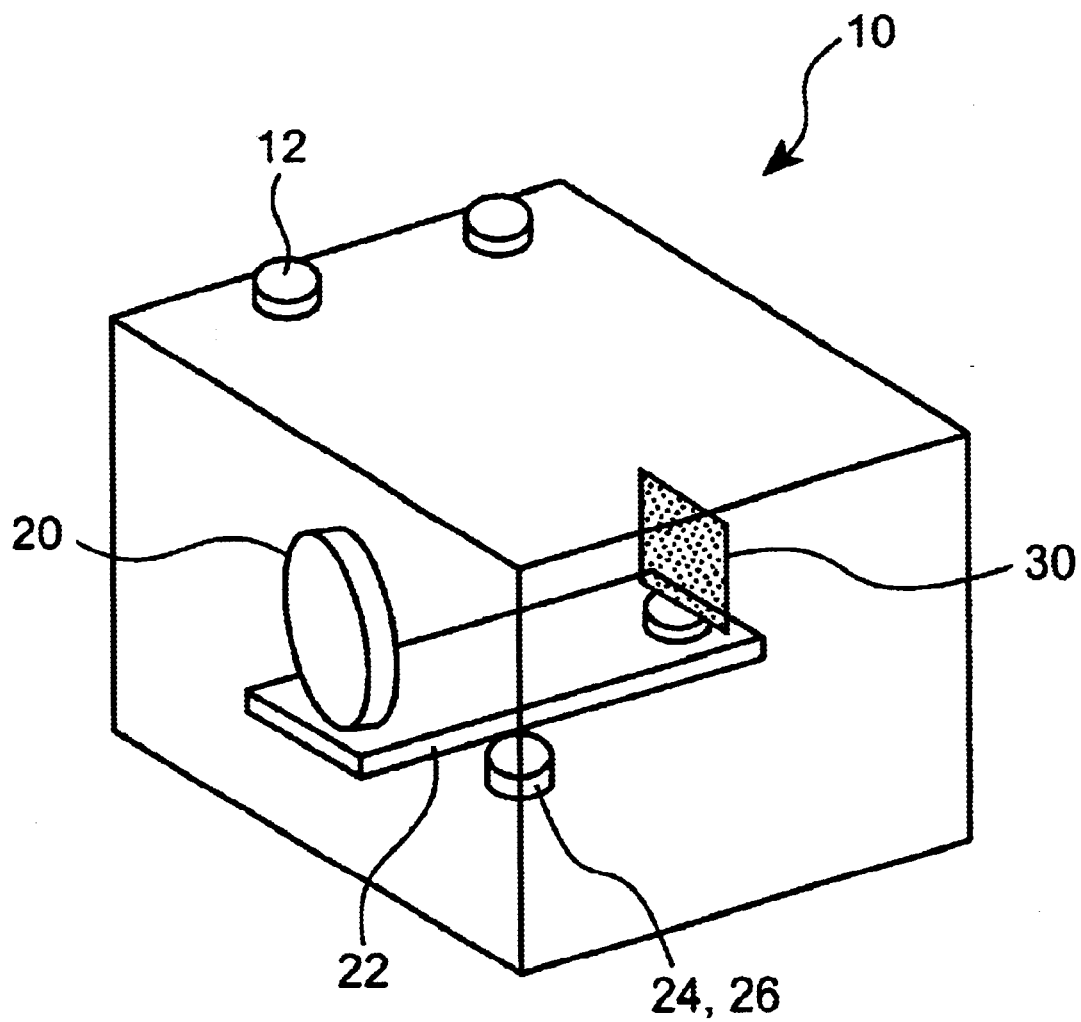
FIG. 1 is a diagram showing the configuration of a digital camera which is an embodiment of the invention.

As indicated in a diagram of FIG. 1 showing the whole configuration, a digital camera 10 has an imaging start button 12 on the upper face of the camera body. The operator presses the button 12 to start the imaging process. In the camera 10, split imaging is performed by moving the optical axis, and split images are then connected together to obtain a high-resolution image or a wide-angle image. Among the images to be connected to one another, there are time differences, and their positional relationships are not constant because of camera shake. As described in detail later, the amount of deviation is detected and an image is then synthesized.

Figure 3A:
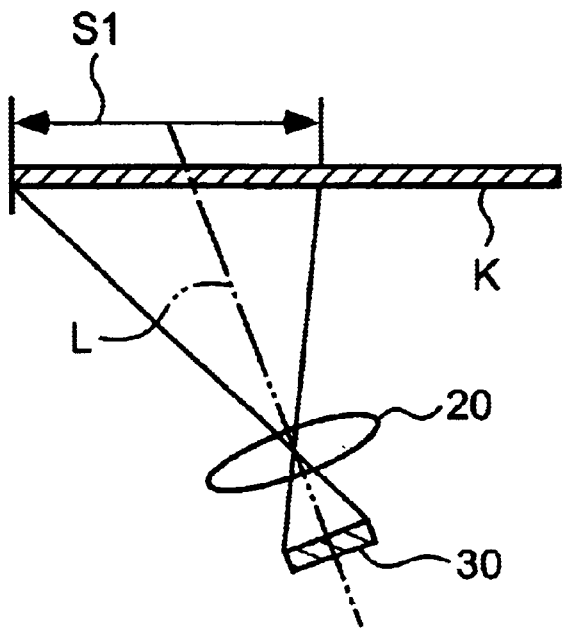
FIGS. 3A and 3B are diagrams illustrating split imaging.
Figure 3B:
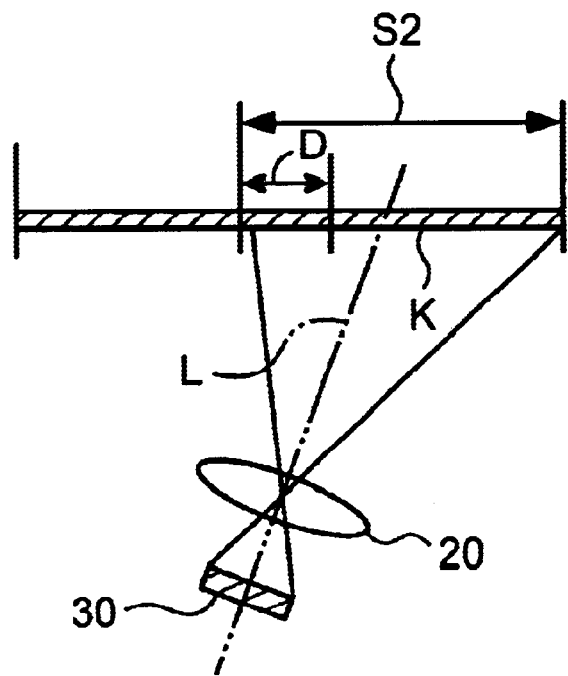

Specifically, a lens 20 and an image sensor 30 are placed on an optical system support 22. The optical system support 22 can be rotated by a motor 24 which is disposed below a center portion of the camera body. An angle sensor 26 which detects the rotation angle of the optical system support 22 is attached to the motor 24. When the optical system support 22 is swung by the motor 24, the lens 20 and the image sensor 30 are integrally swung, so that the optical axis L is moved as shown in diagrams of FIG. 3(A) and FIG. 3(B). As a result, an image of an object is taken with being split into a substantially left-half region S1 and a substantially right-half region S2, and the regions are separately imaged. In order to enable image synthesis, at this time, an overlap region D is formed in the split-imaged regions S1 and S2.

Figure 2:
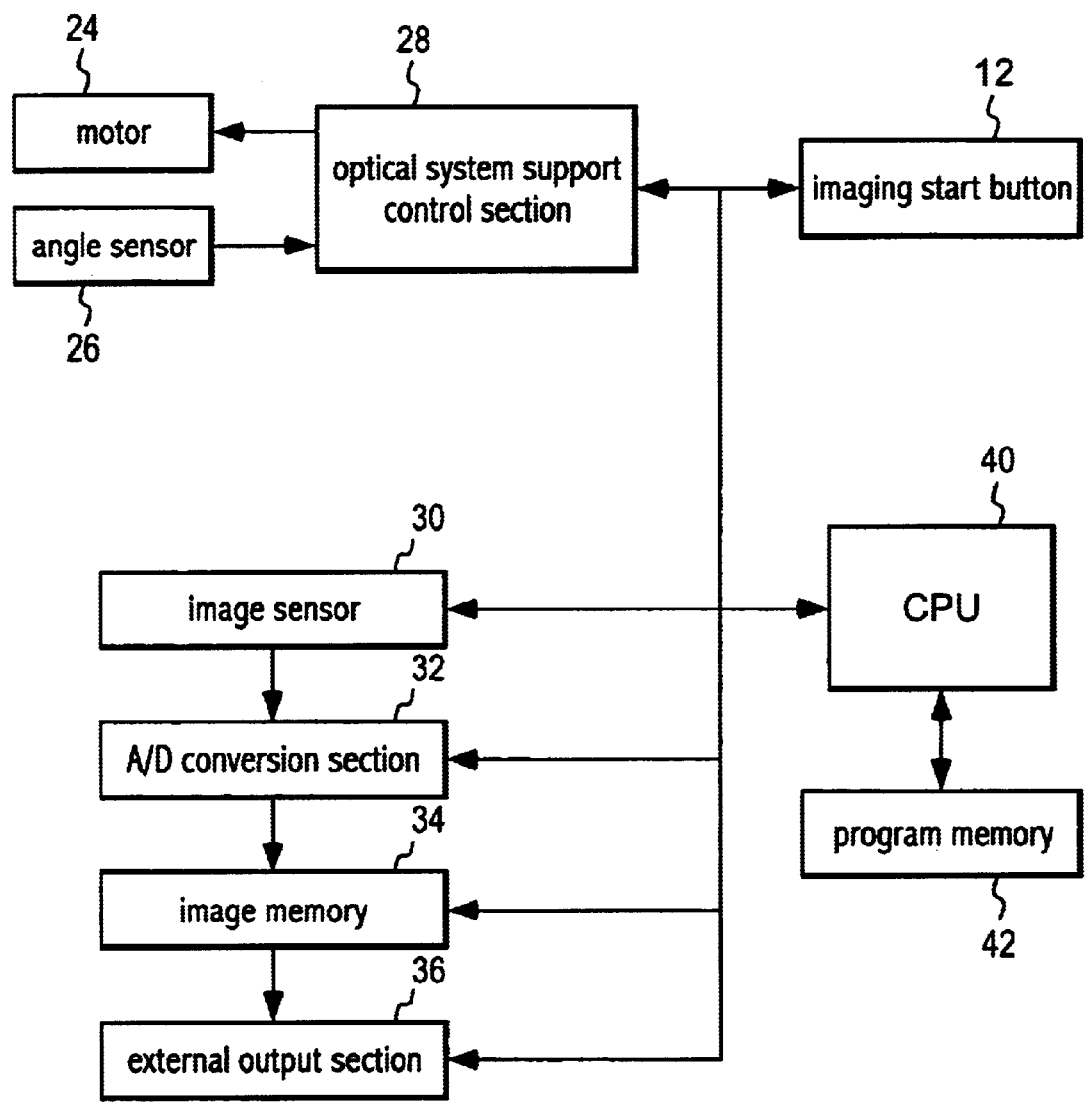
FIG. 2 is a block diagram of the digital camera of FIG. 1.

A control system is configured as shown in a block diagram of FIG. 2.

An optical system support control section 28 controls the motor 24 in accordance with an input from the angle sensor 26. Image data are photoelectrically converted by the image sensor 30, and then A/D-converted by an A/D conversion section 32. The converted data are stored into an image memory 34. In the split imaging, a CPU 40 performs an image synthesize process (steps #14 to #18 which will be described later) by using the data of the images stored in the image memory 34. The CPU 40 reads out programs stored in a program memory 42 and then operates to control processes including connection of images. Namely, the program flows of FIGS. 7 to 9 which will be described later are stored in the program memory 42, and all of them are performed by the CPU 40. Images which have been taken and then stored are output as required from an external output section 36 to an external apparatus such as a computer or a printer.

FIGS. 4(A), 4(B) and 4(C) collectively show the manner of synthesis performed on the right and left images. Because of camera shake or the like, there arises a case where, even when the left image of FIG. 4(A) and the right image of FIG. 4(B) are overlapped with each other, the right and left images fail to correctly coincide with each other in a standard position corresponding to the amount of movement of the optical axis in the camera. In the image, due to camera shake, the rotation component of the optical axis itself produces parallel displacements Dx and Dy, the component of rotation about the optical axis produces a rotation displacement q, and the component in the anteroposterior direction of the camera causes the magnification mag to be changed. Therefore, these components are detected, and the images are geometrically corrected on the basis of the amount of deviation, so that the connection is performed correctly as shown in a synthesized image of FIG. 4(C).

FIGS. 5(A) and 5(B) show the manner of searching the amount of deviation. The amount of deviation has four kinds of components (Dx, Dy, q, and mag). When an exhaustive search is performed in a permissible range of camera shake, i.e., the range of the maximum expected values of the camera shake components, therefore, the search space is enormous as shown in FIG. 5(A). To comply with this, an efficient iterative search is performed which is advanced along an efficient path to reach a deviation position where the images coincide with each other, as shown in FIG. 5(B). Specifically, a search to a coincidence position is performed by repeating movement toward a position where the highest degree of coincidence of the images is attained in the neighborhood of the four kinds of deviation components.

Figure 6A:
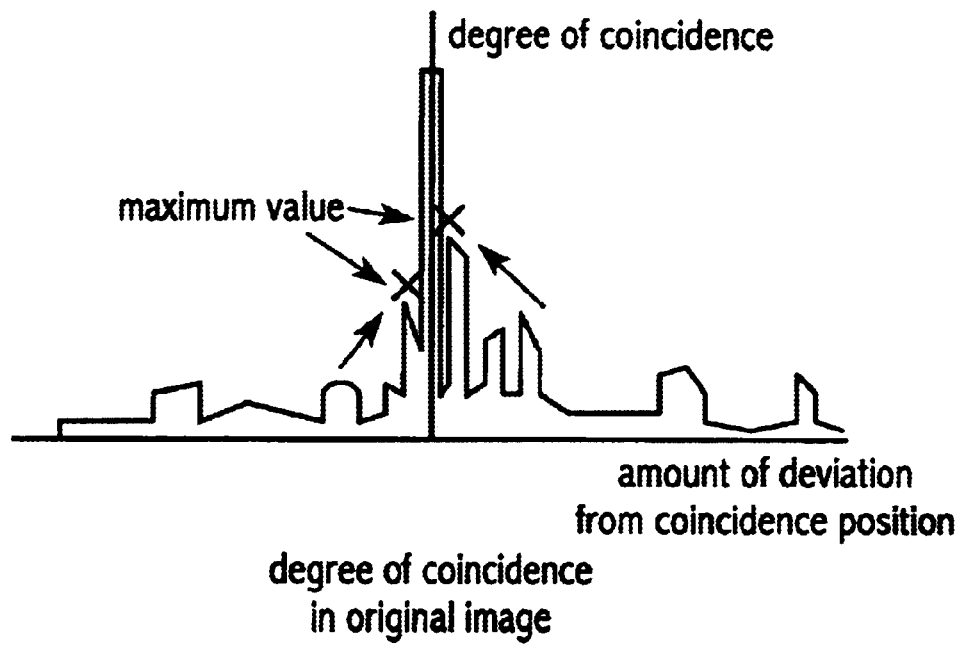
FIGS. 6A and 6B are diagrams illustrating the degree of coincidence between images.
Figure 6B:
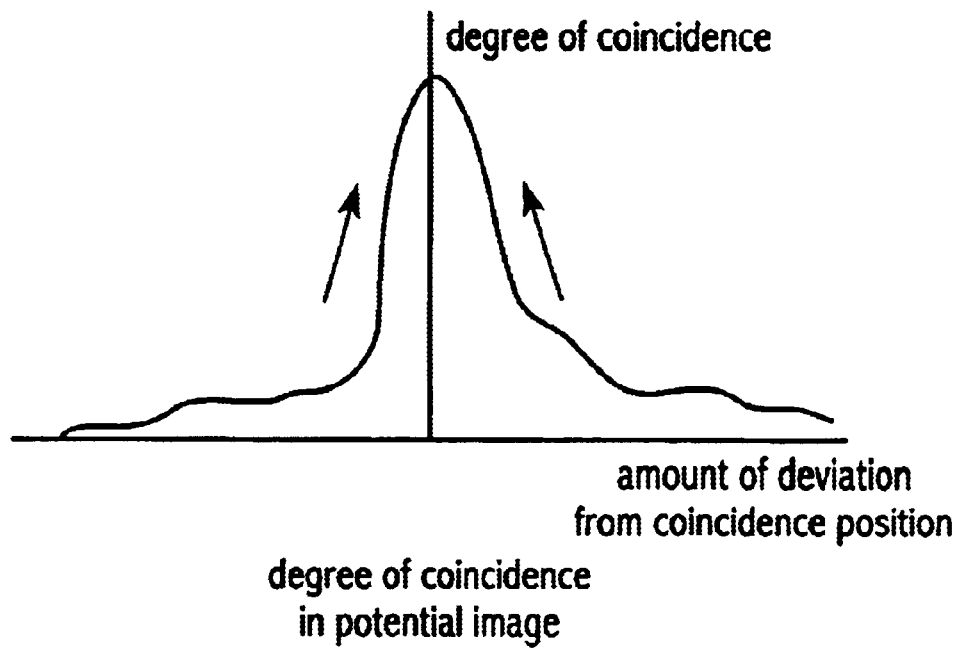

FIGS. 6(A) and 6(B) show relations ships between the amount of deviation and the degree of coincidence. In an image which mainly consists of characters and lines such as rules, the degree of coincidence is not smoothly changed with respect to the amount of deviation as shown in FIG. 6(A). When the position is deviated from a complete coincidence position by the line width or larger, the degree of coincidence is abruptly lowered. Under such circumstances, when the iterative search is advanced from the right or left side as indicated by the arrows, there arises a possibility that the search cannot be further advanced beyond the maximal point in the middle of the path and indicated by × and an incorrect position is erroneously determined as the coincidence position.

Figure 11:
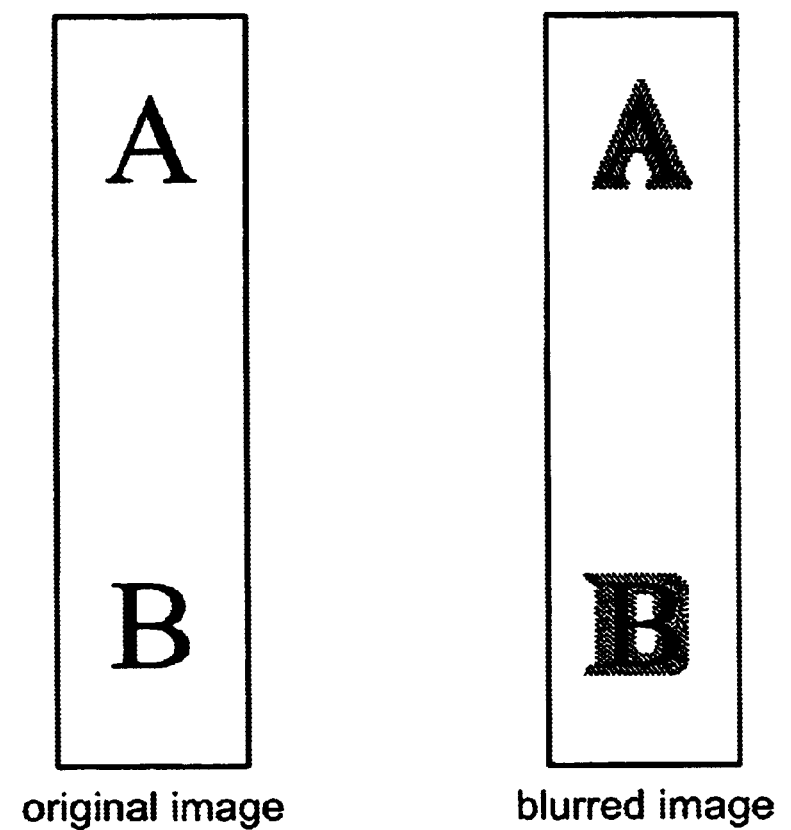
FIG. 11 is a diagram illustrating a blurred image.

In order to solve the difficulty, for example, the digital camera 10 produces a blurred image from the original image, and performs an iterative search for the coincidence position by using the blurred image to detect the amount of deviation, as shown in FIG. 11. The use of a blurred image enables the degree of coincidence to be smoothly changed with respect to the amount of deviation as shown in FIG. 6(B). When the iterative search is advanced from the right or left side as indicated by the arrows, therefore, the search can correctly reach the coincidence position without erroneously determining an incorrect position as the coincidence position.

Next, the operation of the camera 10 will be described.

Figure 7:
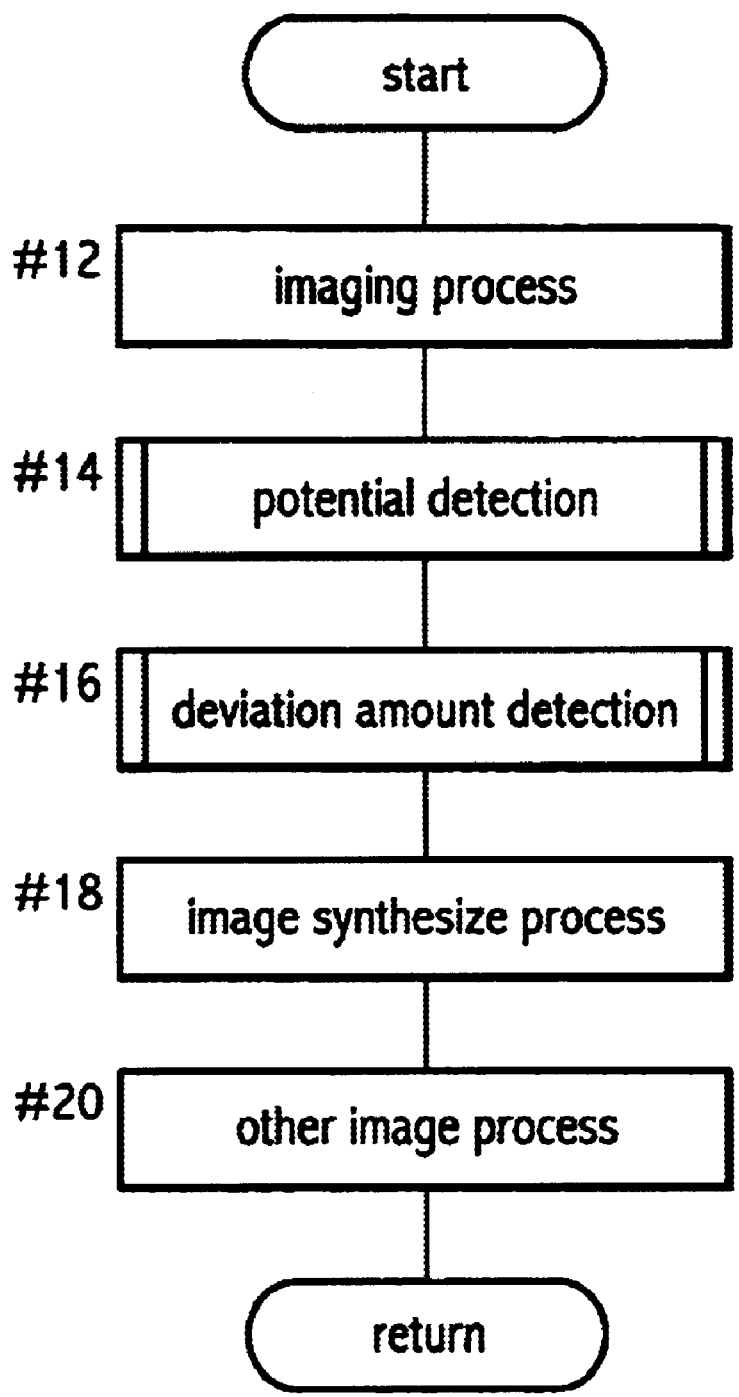
FIG. 7 is a flowchart of the whole operation of the digital camera of FIG. 1.

First, the operation will be described summarily with reference to the flowchart of the whole operation shown in FIG. 7.

When the imaging start button 12 is pressed, the imaging process is started in step #12. In step #14, a potential is detected from the obtained image and a blurred image is then produced. The amount of shift is detected in step #16 by using the blurred image. In step #18, the amount of correction is calculated on the basis of the detected amount of shift, and images are then connected to one another. Other image processes are performed in step #20. In the obtained images, only portions which may overlap one another, are required to undergo the processes of steps #14 and #16.

Figure 8:
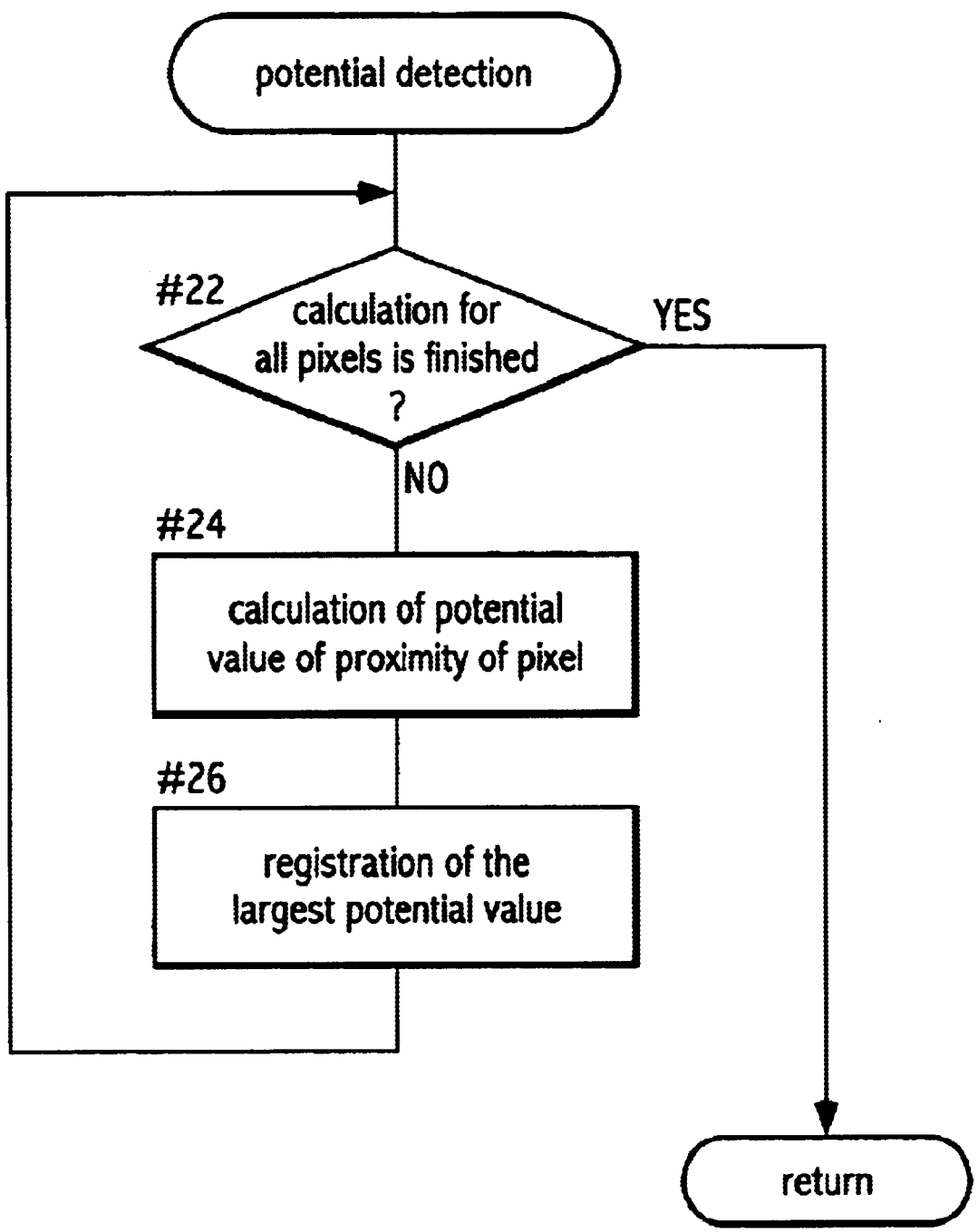
FIG. 8 is a detailed flowchart of step #14 of FIG. 7.

Next, the procedure of step #14 will be described in detail with reference to the detailed flowchart of FIG. 8 and the diagram of FIG. 10.

In this process, among potentials of proximal pixels, a potential which has the largest value in the position of a pixel to be considered is selected. An image which is simply blurred by an averaging filter, a Gaussian filter, or the like is not used because information of peak portions such as a core portion of a character is to be maintained. In other words, the potential of a peak is greater than the potentials of proximal pixels, and hence is not buried.

Specifically, in steps #22 and #24, a potential value P in the position of a pixel to be considered (target pixel) and due to an image in the proximity of the pixel to be considered is calculated for all pixels. As shown by gradation in FIG. 10, for example, a potential field due to a proximal image may be maximum (black) in the position of a proximal pixel to be calculated, monotonically decreases as the distance from the pixel increases, and finally reaches zero or more (white).

Figure 10:
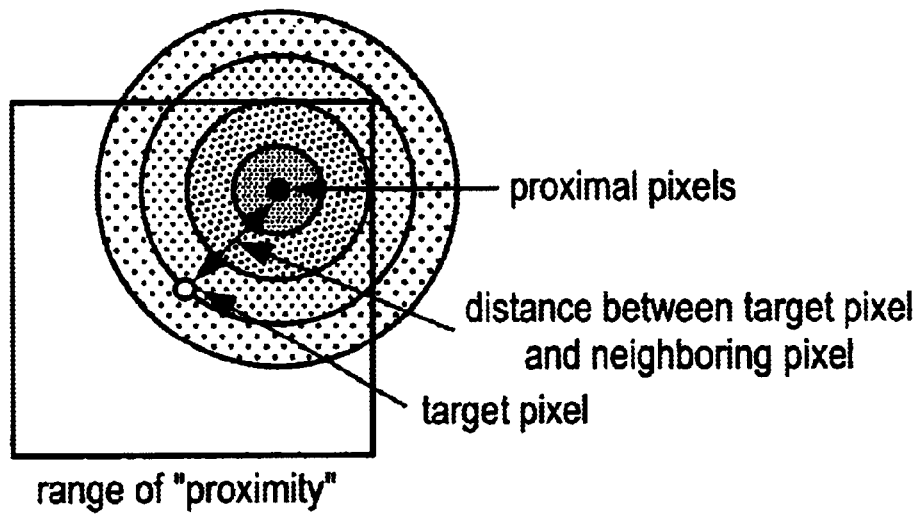
FIG. 10 is a diagram illustrating a potential.

In the example of FIG. 10, "proximity" is set to be in eight neighbor distances or the range of 20 pixels, and the potential value P in the position of a pixel to be considered is obtained by the following expression:

$$P=f-(\text{maximum density}/20) \times d,$$

where, if P<0, then P=0.

In the expression, f is the value of a proximal pixel, and d is the distance between the proximal pixel and the pixel to be considered. When the proximal pixel coincides with the pixel to be considered, the potential value P equals to the value of the pixel to be considered.

In step #26, the largest one of the potential values (the number of which equals to that of proximal pixels) in the position of the pixel to be considered and due to the proximal pixels is selected. The selected potential value is registered as the value of the pixel to be considered. Thereafter, the control returns to step #22 to process the next pixel to be considered. In this way, a blurred image is produced. At this time, the pixel positions of the blurred image are made coincident with those of the original image.

The above process is implemented on both the images which are to be connected to each other.

Figure 9:
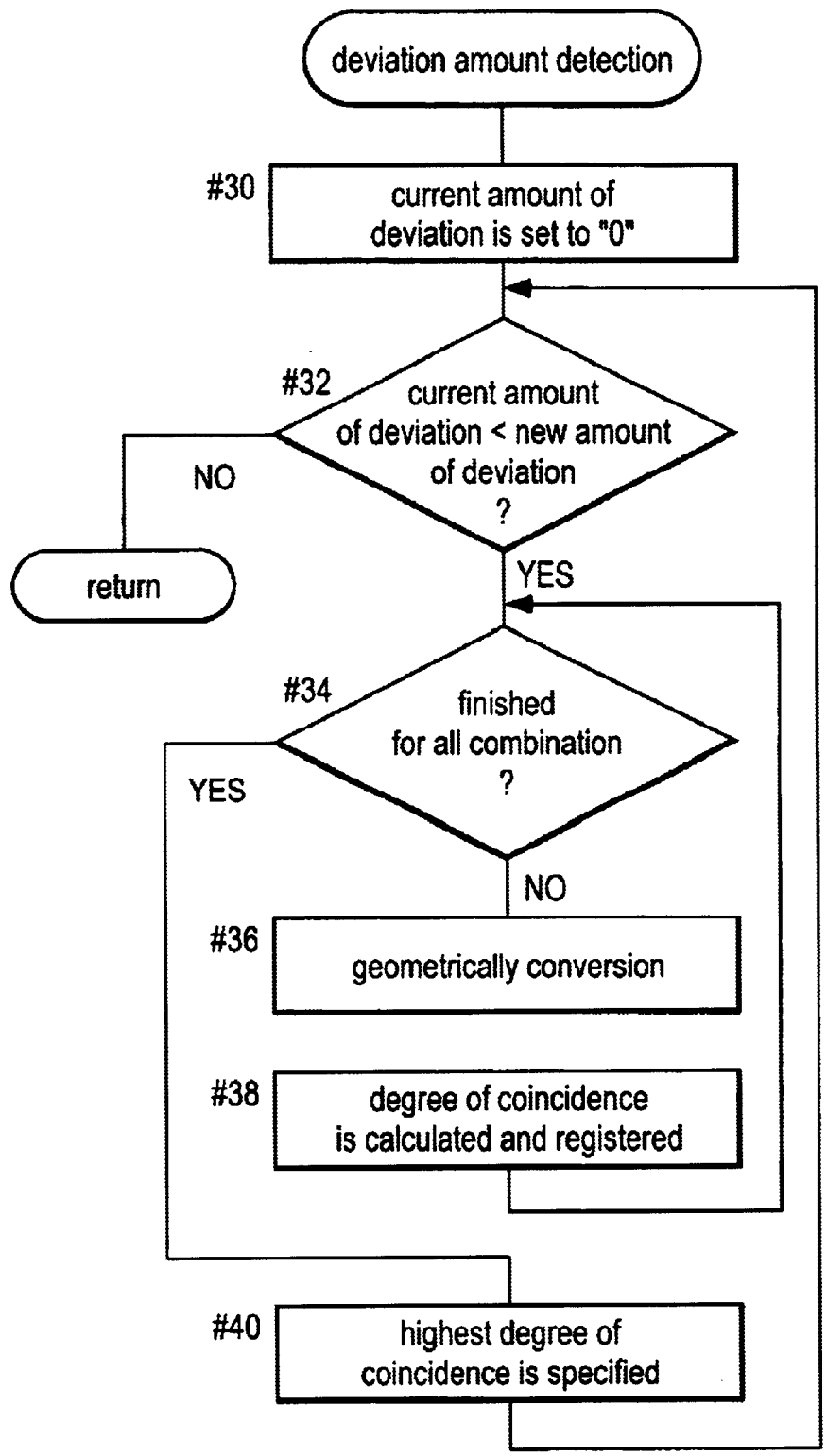
FIG. 9 is a detailed flowchart of step #16 of FIG. 7.

Next, the deviation amount detecting flow of step #16 will be described with reference to the detailed flowchart of FIG. 9.

In this process, the blurred image which has been produced as described above is used.

First, the detection is started from the standard position. In step #30, therefore, "current amount of deviation" is set to 0 for each component. A candidate value which is changed within a limited range from the amount of deviation of the position is set. For example, "x and y: ±3 pixels, 1 pixel step," "θ: ±1 degree, 0.2 degree step," and "mag: ±1%, 0.2% step" are set as candidate values.

In step #34, the following process is repeated until all combinations of the above are processed. For each combination, the blurred image of one of the images (for example, the right image in FIG. 4(B)) is geometrically converted in step #36, and the degree of coincidence between the geometrically converted image and the blurred image of the other image (for example, the left image in FIG. 4(B)) is calculated in step #38. As the degree of coincidence, for example, a value which is obtained by multiplying the square sum of differences between pixel values with −1 is used. When only x and y are to be detected, geometrical conversion such as rotation and expansion or contraction are not required.

When the process has been performed on all the combinations, a combination of amounts of deviation in which the highest degree of coincidence is attained is selected in step #40. In step #32, if the degree of coincidence is higher than that of the previously selected combination, "current amount of deviation" is updated to the amount of deviation of the selected combination. Then, the process subsequent to step #34 is repeated. If NO, the process is ended, and "current amount of deviation" is determined as the amount of deviation between the images.

Thereafter, the original images are geometrically corrected by using the thus obtained amount of deviation, and then connected to each other.

As described above, when split images are to be connected to one another, the digital camera 10 can perform a search by efficiently advancing along a search path to the coincidence position, whereby the complexity can be reduced. Therefore, an image synthesize process can be completed for a short time period.

The invention is not restricted to the embodiment, and may be implemented in various manners.

The embodiment is configured so that the image synthesize process is performed in a split-imaging apparatus. Alternatively, the image synthesize process is performed by an external apparatus such as a personal computer. In the alternative, the flows of FIGS. 7 to 9 are supplied in the form of software which is stored in a recording medium such as a CD-ROM, and then read into a personal computer to be implemented. However, step #12 of FIG. 7 is changed to "image data input." In this step, image data may be directly supplied from an imaging apparatus, or data which have been once stored in the form of an image file may be read.

The invention is not restricted to such a split-imaging apparatus. Also when images which are taken by a usual digital camera, a scanner, or the like are to be connected to one another, the images can be processed in the same manner as described above. In this case, the image data are processed by a computer which is integrated with an imaging apparatus or that which is separated from such an apparatus, and hence software can be provided by means of a recording medium such as a CD-ROM in the same manner as described above.

What is claimed is:

1. An image synthesizing apparatus which, from data of images of plural subregions overlapping in boundary proximal portions, synthesizes data of a whole synthesized image in which the images are connected to one another so as not to be discontinuous in the boundary proximal portions, wherein said apparatus comprises:

blurred image producing means for producing blurred images with respect to the overlapping boundary proximal portions of the images of the plural subregions;

deviation amount detecting means for detecting an amount of deviation among the produced blurred images; and image synthesizing means for synthesizing the data of the whole synthesized image by using the detected amount of deviation among the blurred images as an amount of deviation among the images of the subregions.

2. An image synthesizing apparatus according to claim 1, wherein said deviation amount detecting means performs an iterative matching operation in which a degree of coincidence when relationships among the blurred images are virtually changed within a limited range is calculated, a change of a highest degree of coincidence within said limited range is implemented, and the calculation and the implementation are repeated; ends the iterative matching when the highest degree of coincidence is equal to or smaller than the highest degree of coincidence of previous matching operations; and detects the amount of deviation among the blurred images of the subregions at this said end of said iterative matching.

3. An image synthesizing method of, from data of images of plural subregions overlapping in boundary proximal portions, synthesizing data of a whole synthesized image in which the images are connected to one another so as not to be discontinuous in the boundary proximal portions, wherein said method comprises:

a first step of producing blurred images with respect to the overlapping boundary proximal portions of the images of the plural subregions;

a second step of detecting an amount of deviation among the produced blurred images; and a third step of synthesizing the data of the whole synthesized image by using the detected amount of deviation among the blurred images as an amount of deviation among the images of the subregions.

4. The image synthesizing method of claim 3, wherein said third step includes detecting potentials from said images in said plural subregions, said detecting step including calculating a potential value P in the position of a pixel under consideration by the following expression:

$$P = f - (\text{maximum density/a number of proximal pixels}) \times d,$$

where if P<0, then P=0, and f is the value of a proximal pixel, and d is the distance between the proximal pixel and the pixel to be considered, wherein when the proximal pixel coincides with the pixel to be considered, the potential value P equals to the value of the pixel to be considered.

5. The image synthesizing method of claim 4, further comprising the step of registering the largest one of the potential values in the position of the pixel to be considered; and repeating said detecting step until a blurred images of said images in said plural subregions.

6. The image synthesizing method of claim 3, wherein said deviation amount detecting step includes starting from a standard position and setting a current amount of deviation is set to 0 for each component;

setting a candidate value within a limited range of amounts; and processing each candidate by
geometrically converting the blurred image of one of the images, and
calculating a degree of coincidence between the geometrically converted image and the blurred image of an overlapping image;

repeating said setting and processing steps until all candidates are processed; and when the process has been performed on all the candidates, selecting a combination of amounts of deviation in which the highest degree of coincidence is attained as the amount of deviation between the images.

7. A computer-readable recording medium on which recorded is an image synthesize processing program for, from data of images of plural subregions overlapping in boundary proximal portions, synthesizing, by means of a computer, data of a whole synthesized image in which the images are connected to one another so as not to be discontinuous in the boundary proximal portions, wherein said image synthesize processing program causes the computer to implement procedures of:

producing blurred images with respect to the overlapping boundary proximal portions of the images of the plural subregions;

detecting an amount of deviation among the produced blurred images; and synthesizing the data of the whole synthesized image by using the detected amount of deviation among the blurred images as an amount of deviation among the images of the subregions.

8. The computer-readable recording medium of claim 7, wherein said image synthesize processing program causes the computer to implement procedures of:

detecting potentials from said images in said plural subregions, said detecting step including calculating a potential value P in the position of a pixel under consideration by the following expression:

$$P=f-(\text{maximum density}/\text{a number of proximal pixels}) \times d,$$

where if P<0, then P=0, and f is the value of a proximal pixel, and d is the distance between the proximal pixel and the pixel to be considered, wherein when the proximal pixel coincides with the pixel to be considered, the potential value P equals to the value of the pixel to be considered.

9. The computer-readable recording medium of claim 8, wherein said image synthesize processing program causes the computer to implement procedures of: registering the largest one of the potential values in the position of the pixel to be considered; and repeating said detecting step until a blurred images of said images in said plural subregions.

10. The computer-readable recording medium of claim 7, wherein said image synthesize processing program causes the computer to implement said deviation amount detecting step by starting from a standard position and setting a current amount of deviation is set to 0 for each component;

setting a candidate value within a limited range of amounts; and processing each candidate by
geometrically converting the blurred image of one of the images, and
calculating a degree of coincidence between the geometrically converted image and the blurred image of an overlapping image;

repeating said setting and processing steps until all candidates are processed; and when the process has been performed on all the candidates, selecting a combination of amounts of deviation in which the highest degree of coincidence is attained as the amount of deviation between the images.

11. A digital camera comprising:

a lens;

an image sensor;

an optical system support rotatably holding said lens and said image sensor;

an angle sensor which detects the rotation angle of the optical system support; and a control system, wherein said control system includes
an optical system support control section which controls the angular of said optical system support in accordance with an input from the angle sensor;
A/D converter for converting image data photoelectrically converted by the image sensor;
image memory for storing said converted image data; and
a CPU performing an image synthesize process by using the data of the images stored in the image memory, producing a blurred image from the original image, and performing an iterative search for the coincidence position by using the blurred image to detect an amount of deviation.

12. A digital camera according to claim 11, wherein said CPU performs an iterative matching operation in which a degree of coincidence when relationships among the blurred images are virtually changed within a limited range is calculated, a change of a highest degree of coincidence within said limited range is implemented, and the calculation and the implementation are repeated; ends the iterative matching when the highest degree of coincidence is equal to or smaller than the highest degree of coincidence of previous matching operations; and detects the amount of deviation among the blurred images of the subregions at this said end of said iterative matching.

* * * * *